March 5, 1940.　　　L. J. MISURACA　　　2,192,522
CUTTER HEAD
Filed Aug. 7, 1937　　　2 Sheets-Sheet 1
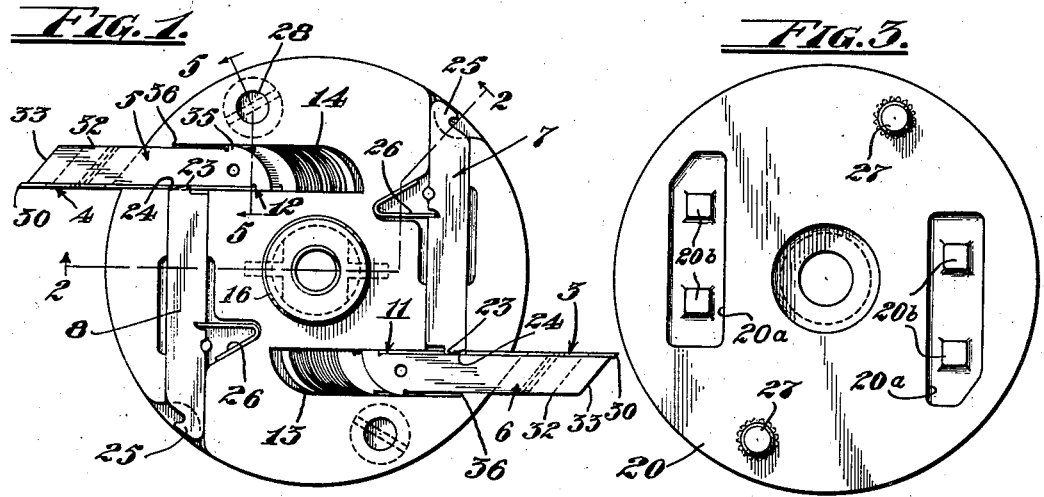
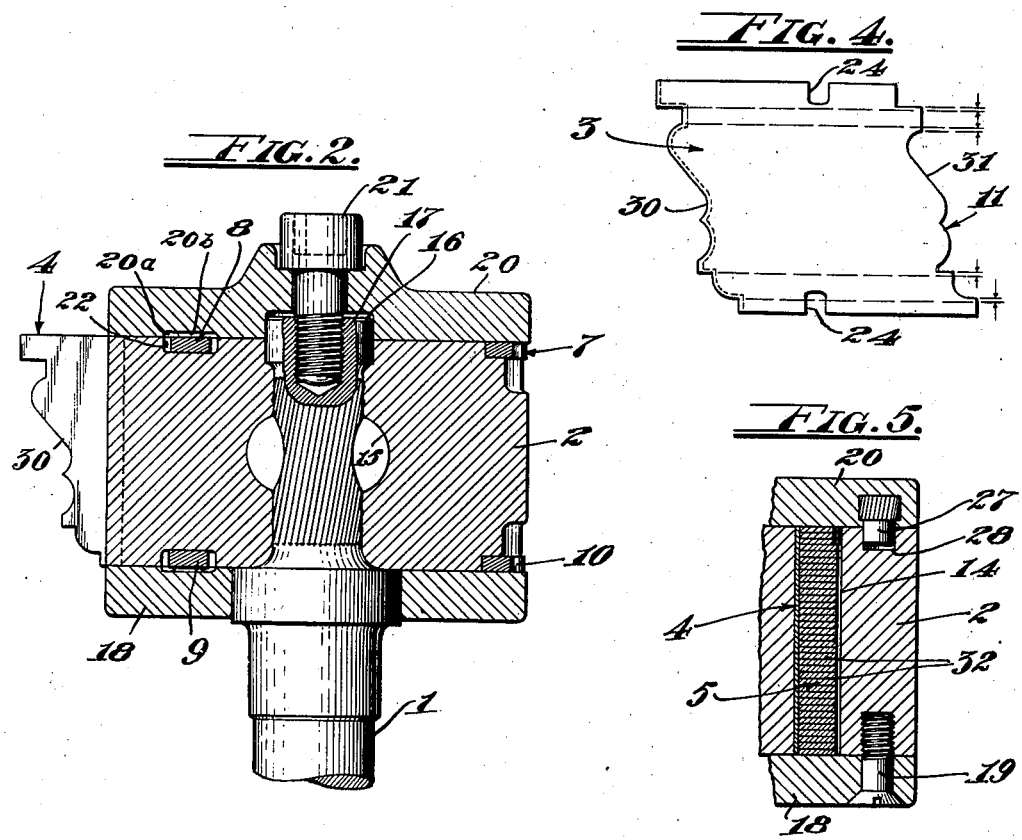
Inventor
Louis J. Misuraca
Attorney.

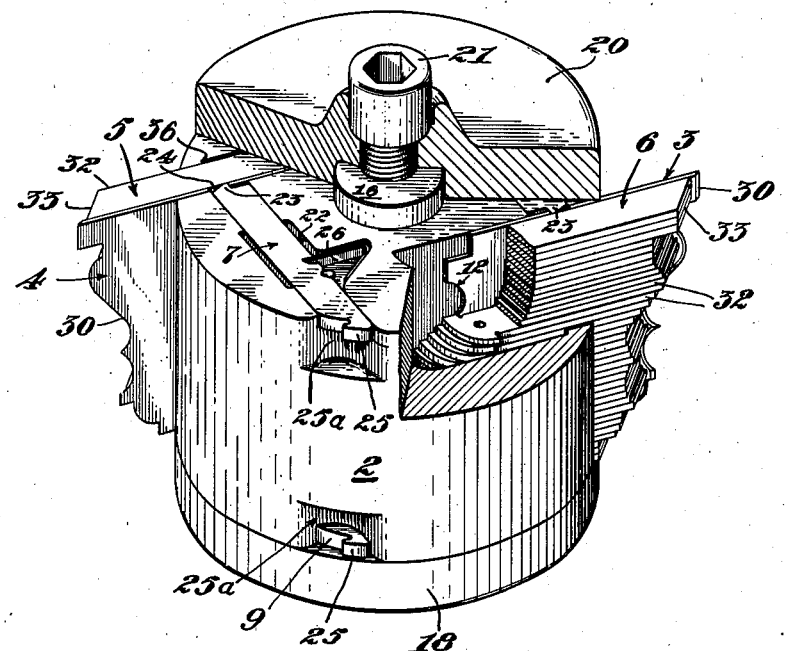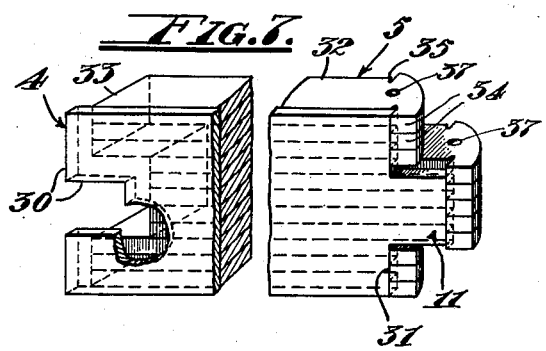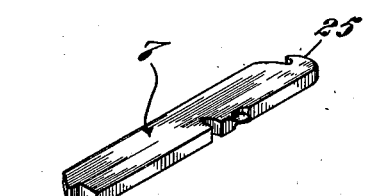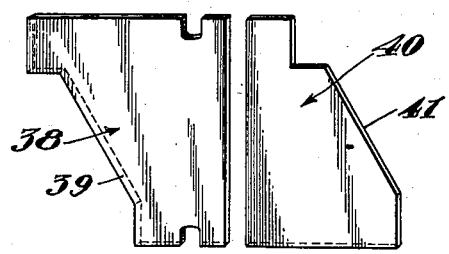

Patented Mar. 5, 1940

2,192,522

UNITED STATES PATENT OFFICE 2,192,522

CUTTER HEAD

Louis J. Misuraca, Glendale, Calif.

Application August 7, 1937, Serial No. 157,965

12 Claims. (Cl. 144—236)

The present invention relates to improvements in cutter heads for vertical spindle shapers, sticking machines and other woodworking machinery, and is somewhat similar to the cutting tool disclosed in my application for patent, Serial No. 94,211, filed August 4, 1936, Patent No. 2,149,618, dated March 7, 1939.

One of the objects of this invention is to provide a cutter consisting of a blade of novel form together with reinforcing means therefor, wherein the blade may be quickly, easily and inexpensively produced as by being die blanked or ground, or both, from a thin sheet of high speed tool steel or other suitable steel and in any pattern desired.

Another object of this invention is to provide a cutter head of the character described, wherein the effective and advantageous use of thin, easily produced and comparatively inexpensive blades is made possible by a plurality of reinforcing members that are readily adjustable into blade reinforcing positions with respect to blades of various patterns.

A further object of this invention is to provide a cutter head wherein the reinforcing members are caused to substantially follow and be maintained in the contour of the cutting edge adjacent to the latter through the instrumentality of templet means carried by said head in a novel arrangement thereon.

Another object is to provide a cutter head of the character described, wherein the reinforcing members may be automatically set and maintained in the desired reinforcing positions with respect to the cutting edge of the blade as aforesaid, by centrifugal force.

Another object is to provide a cutter head in which variously contoured blades may be quickly and easily inserted and removed to produce various patterns, without requiring disassembling of the head or necessitating the exercise of any particular skill.

A further object is to provide a cutter head such as described, wherein the blade and templet means may be readily changed as desired, without otherwise disturbing the head and while the same reinforcing means is used, the latter being adaptable to blades and templets or various patterns.

Another object of this invention is the provision of a cutter head which as a comparatively inexpensive unit will serve as a practical tool for the amateur woodworker or hobbyist or for commercial purposes, in that blades and templets in standard designs or in fact, in any design, also the body and the reinforcing laminations can be supplied by the manufacturer with greater facility and a minimum of machining requirements, and further in that each blade may be formed with a cutting edge and a templet or pattern edge, or the templets and blades separately formed. It is important to note that the construction and relative arrangement of the blades, reinforcing means and associated elements make possible the advantageous use of a die cast cutter body or head as here illustrated.

Other objects and advantages may appear in the description of the invention hereinafter following.

I have shown a preferred form of the invention in the accompanying drawings, subject to modification within the scope of the claims appended hereto, without departing from the spirit of the invention.

In said drawings:

Fig. 1 is a top plan view of a cutter head constructed in accordance with this invention, with the closure plate removed;

Fig. 2 is a sectional view taken on the plane of line 2—2 of Fig. 1;

Fig. 3 is a bottom plan view of the closure plate;

Fig. 4 is a side elevation of one of the cutting blades as when having the templet embodied therein;

Fig. 5 is a sectional view taken on the plane of line 5—5 of Fig. 1;

Fig. 6 is a fragmentary perspective view of the cutter head;

Fig. 7 is a fragmentary perspective view of the blade and reinforcing means therefor, as when in operative relation;

Fig. 8 is a perspective view of one of the reinforcing laminations;

Fig. 9 is a perspective view of one of the blade locking bolts;

Fig. 10 is a perspective view of a variational form of invention wherein the blade and templet means are formed as separate pieces.

In this invention, particularly the embodiment thereof shown in the accompanying drawings, I provide for operation in a vertical spindle shaper or the like, a cutter head mounted upon a spindle and comprising a cylindrical rotary body 2, cutting blades 3 and 4 thereon, reinforcing means 5 and 6 for said blades, blade locking bolts 7, 8, 9 and 10 and templet means 11 and 12 cooperating with said reinforcing means.

As shown the body 2 is provided with slots 13 and 14 which receive the blades, the reinforcing means and said templet means. The body 2 if die cast may be keyed as at 15 or otherwise secured to the spindle 1 so that the latter projects above the body in the form of a boss 16 having a screw threaded bore 17. A die cast circular plate 18 is secured by fastenings 19 upon the lower side of the body for closing the lower ends of the slots 13 and 14, whereas a similar plate 20 is removably secured upon the upper side of the body by means of a suitable threaded fastening element 21. The bolts 7, 8, 9 and 10 are slidably positioned in the recesses 22 formed in the upper and lower faces of the body and having reduced ends 23 adapted to engage in notches 24 formed in the upper and lower edges of the blades 3 and 4, whereby to positively secure the blades in place. The plates 18 and 20 have recesses 20A substantially registering with the body recess 22. In these recesses 20A are bosses 20B adapted to engage the bolts 7, 8, 9 and 10.

It will be noted that each of the blade locking bolts is provided with a hook end 25 disposed in a body recess 25A and providing for the retraction thereof against the action of a spring 26 which normally holds the bolt in blade locking position. The plate 20 may be provided with depending locking pins 27 to seat in the sockets 28 formed in the upper face of the body 2.

In accordance with this invention each of the blades 3 and 4 is alike and may be formed from a thin sheet of high speed tool steel or any other suitable steel of, for example, .025 of an inch thick, or other gauge, the object being to provide for an expeditious production of extremely thin steel blades of any pattern, by the die blanking or by grinding a group in a fixture or by other methods. Regardless of the method used in making the blades, each is provided with a sharpened or beveled cutting edge 30 of the desired pattern and may also include the templet means as an integral part thereof. As particularly shown in Fig. 4, the end of the blade opposite that having the cutting edge thereon, is provided with a pattern or templet edge 31 substantially corresponding in contour to that of the cutting edge, though not beveled.

It is now seen that these blades may be readily inserted and removed relative to the slots 13 and 14, and that they will be positively held with their cutting edges equidistantly spaced from the center of the cutter head by means of the locking bolts 7, 8, 9 and 10 engaging in the notches 24 formed in the upper and lower edges of said blades.

To remove a blade it is only necessary to engage the hook ends 25 of these bolts with a suitable tool not shown, retract them from locking position, then slip out the blade or blades to be removed. When inserting different or new blades the bolts snap into locking position without use of said tool.

The reinforcing means here provided comprises a plurality of centrifugally adjustable reinforcing members 32 in the form of substantially rectangular leaves or laminations laid flatwise one upon the other for slidable adjustment into reinforcing position. The outer or reinforcing ends of these blades are pointed or beveled as at 33 for cutting clearance and are adapted to be equidistantly inwardly spaced from the cutting edges of the cutter blades as particularly shown in Figs. 1 and 6. The desired extent of these pointed ends is also indicated by the dotted line shown in Fig. 4 as approximately following the contour of the cutting edge 30. Each reinforcing member 32 is of less width than and has a sliding fit in the cutter slot in which it rides and is provided with a templet engaging heel or projection 34 extending laterally from the inward end thereof. This templet engaging portion is adapted to engage the pattern edge 31 of the templet means so as to limit the extent of the blade to a position lying close to and spaced inwardly of the cutting edge 30. It is thus seen that when the head 2 is rotated, the laminations will be centrifugally projected into reinforcing position. The outward extent of each lamination is determined by the pattern edge 31 which acts as an abutment for the templet engaging portions 34 on the laminations, the effective length of the laminations and the overall length of the cutters being correlative.

As a safety means to prevent complete displacement of the reinforcing laminations 32 if the head is accidentally rotated without blades in place, said laminations are provided with projections 35 similar to the ones 34 which are adapted to engage limiting shoulders 36 provided on the body 2. For purposes of collectively removing and releasing the laminations in group units, registering opening 37 are provided, so that a suitable tool, not shown, may be inserted therein.

It should be noted that in place of having the templet means provided as an integral part of the cutter blades, I may (as shown in Fig. 10) utilize a blade 38 having a cutting edge 39 and a separate templet 40 of similar or other composition, which latter is provided with a pattern edge 41. This type of blade has its inner edge arranged to abut an edge of the templet so that it is positioned in the cutter head in the same manner as the blade and templet shown in Fig. 4. This type of blade permits of a saving in tool steel in that the templet 40 may be made of less expensive material and may also reduce machining costs.

In view of the fact that the die blanked reinforcing blades or laminations 32 are comparatively thin and of uniform dimensions, it is seen that if the pattern or templet edges of the templet means were in exact correspondence with the contours of the cutting edges, certain of the laminations might extend to positions which would interfere with the cutting action of the blades. This is particularly true where patterns such as shown in Fig. 7, for forming tongue and groove cuts, are employed. For this reason, the pattern edges of the templets or templet means are formed with modified conformity to the contour of the cutting edges so that, for example, all reentrant portions or horizontally disposed edges of the pattern edge are out of the plane of the corresponding portions or edges of the cutting edges to a relative extent, as indicated by the dotted lines on the right hand side of Fig. 4. This affords a clearance factor which positively prevents critical laminations from extending into cutting edge interfering position. As here shown, these laminations throughout their length engage with the opposed face of the cutter blades but may be otherwise disposed provided that they do not interfere with the cutting edge thereof, as particularly shown in Figs. 1, 6 and 7, and as indicated by the dotted showing at the left of Fig. 4. It is obvious that these reinforcing laminations may be arranged or positioned and shaped as desired, inasmuch as the prime purpose thereof is to effectively reinforce a thin blade adjacent the cutting edge thereof and that they be subject to repeated use for variously contoured blades without necessitating removal from the cutter head and, further, that these laminations be subject to automatic extension into proper reinforcing position under the influence of centrifugal force upon rotation of the cutter head.

It is now seen that by supporting the relatively thin cutter blades with a series of adjustable reinforcing laminations permanently set in the cutter head and extensible to positions adjacent the cutting edges of said blades, there is provided cutting means of desired pattern which will accomplish the same results as blades of such pattern made of heavy standard thickness. Thus the provisions of this invention will enable a quick and easy production at a comparatively low cost of a large quantity of thin blades of any given pattern. After the blades are set in the cutter head, no clamping or other preparation operation is required to set the tool for operation, for, after the head is rotated, the reinforcing laminations will be automatically extended into and be maintained in the proper reinforcing position adjacent the cutting edges of the blades under the control of the templet means and thereupon the tool is ready for immediate use. The cutter parts will remain in the proper positions due to centrifugal force. However, if desired, the parts 21 and 20 may be used to effect a clamping or holding pressure on the blades and laminations.

I claim:

1. A cutter including a body, a blade thereon having a cutting portion, a plurality of adjustable blade reinforcing members supported by said body adjacent said portion, templet means on said body and templet engaging portions on said members for determining the positions of said members relative to said portion.

2. A cutter head comprising a body, a blade extending therefrom and having a cutting edge, a plurality of blade reinforcing laminations relatively extensible from and carried by said body for engagement with said blade, and templet means for engaging and determining the positions of said laminations relative to said cutting edge.

3. A cutter head comprising a body, a blade extensible therefrom and having a cutting edge, templet means on said body having a pattern edge substantially corresponding in contour to that of said cutting edge, and blade reinforcing means adjustably supported by said body, and having a portion engaging said templet, to determine the position of said reenforcing means relative to said cutting edge.

4. A cutter head comprising a body, a blade extended therefrom and having a cutting edge, reinforcing means for said blade, including laminations carried by and being relatively extensible from said body towards said cutting edge, and templet means on said body cooperating with said laminations to limit the extension thereof to positions close to and substantially equidistantly spaced from said cutting edge to form a backing therefor.

5. A cutter head comprising a rotary body, a blade extending from said body and having a cutting edge, templet means carried by said body having a pattern edge substantially corresponding in contour to said cutting edge, blade reinforcing laminations carried by said body and being relatively extensible into reinforcing position by centrifugal force upon rotation of said head, portions on said laminations cooperating with said templet edge, and means for releasably holding said laminations in blade reinforcing position.

6. A cutter head including a rotary body, blades fixed thereon extending outwardly therefrom and having cutting edges on their extended portions, a plurality of independently extensible cutting edge reinforcing laminations mounted on and arranged to be extended from said head into said cutting edge reinforcing position by centrifugal force when said body is rotated, and means for releasably holding said laminations in said reinforcing position.

7. A cutter head including a rotary body, blades fixed thereon extending outwardly therefrom and having cutting edges on their extended ends, a plurality of independently extensible cutting edge reinforcing laminations mounted on and arranged to be extended from said head into cutting edge reinforcing position by centrifugal force when said body is rotated, means for releasably holding said laminations in said reinforcing position, and templets on said body for determining the relative extension of said laminations to adapt them to conformation with cutting edges of variable contours.

8. A cutter head comprising a rotatable body, a blade thereon having a cutting portion, a plurality of blade reinforcing members arranged to be moved into reinforcing position by centrifugal force when said head is rotated and means for limiting the movement of said members to predetermined positions relative to said cutting portions.

9. A cutter including a rotatable body, a plurality of blades thereon having cutting edges and templet edges, and a plurality of blade reinforcing members arranged to be centrifugally extended to and maintained in blade reinforcing position upon rotation of said head and having portions cooperating with said templet edges.

10. A cutter including a body, a plurality of blades thereon having cutting edges and templet edges, and a plurality of blade reinforcing members arranged to be centrifugally extended to and maintained in blade reinforcing position upon rotation of said head and having portions coperating with said templet edge, said blades having notches therein and spring urged locking bolts on said body having portions engaging in said notches.

11. A cutter including a body, a plurality of blades thereon having cutting edges and templet edges, and a plurality of blade reinforcing members arranged to be centrifugally extended to and maintained in blade reinforcing position upon rotation of said head and having portions cooperating with said templet edge, said templet edge substantially corresponding to the contour of said cutting edge and having portions vertically displaced from corresponding portions of the cutting edge.

12. A cutter head including a blade having cutting and templet portions of substantially corresponding irregular contour, and blade reinforcing members having portions engaging said templet portion to determine the position of said reenforcing members relative to the cutting portion of said blade.

LOUIS J. MISURACA.